United States Patent Office 3,095,280
Patented June 25, 1963

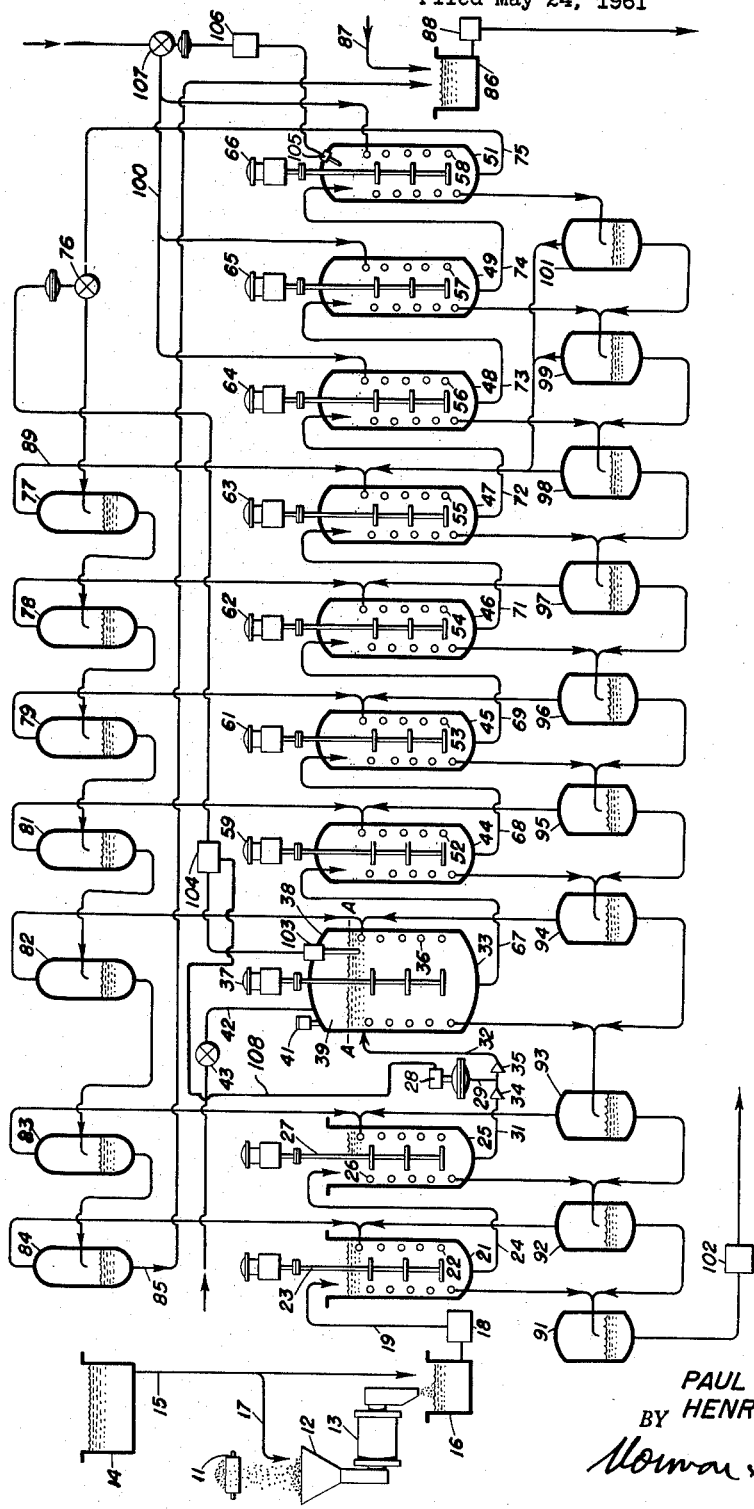

3,095,280
APPARATUS FOR THE CONTINUOUS DIGESTION OF BAUXITE
Paul Soudan, Aix-en-Provence, and Henri Mercier, Gardanne, France, assignors to Pechiney Compagnie de Produits Chemique et Electrometallurgique, Paris, France, a corporation of France
Filed May 24, 1961, Ser. No. 135,688
4 Claims. (Cl. 23—290)

This invention relates to an apparatus for the continuous digestion of bauxite and more particularly to the continuous treatment of powdered bauxite with an alkaline solution. This is a continuation-in-part of patent application Serial Number 720,435, filed March 10, 1958, now abandoned.

It is often necessary in industrial processing to subject powdered solids to the action of liquids; this is particularly true in the case of subjecting minerals to attack by acids or bases in order to extract a desired component of the mineral. An important example of such an operation is the extraction of alumina from pulverized bauxite by means of alkaline solutions. In spite of the fact that it would be highly advantageous to carry out this process in a continuous manner, it has not been possible successfully to obtain such continuous performance; several difficulties arise, mainly because of the necessity of pumping and circulating slurries containing abrasive solids. In the operation of the continuous digestion of bauxite at high temperatures and pressures, the possibility of a dangerous explosion has always been present. Also, the aluminum oxide of European bauxites is in the form of the monohydrate, which is difficult to attack with caustic soda, so that the yield is low. These and other difficulties experienced with the prior art apparatus have been obviated in a novel manner by the present invention.

It is, therefore, an outstanding object of the invention to provide an apparatus for the continuous digestion of bauxite in which the pumping and circulating of slurries is facilitated, in which the initial cost of equipment is minimized, and in which maintenance is considerably reduced.

Another object of this invention is the provision of a continuous digestion technique for bauxite which provides for the recovery of the heat of the liquid and provides for greater thermal efficiency.

It is a still further object of the present invention to provide for continuous chemical digestion of bauxite in a series of autoclaves in which the pumping pressures and the pressures in the individual autoclaves are maintained at a high level.

A further object of the instant invention is the provision of an apparatus containing a series of autoclaves through which a slurry of bauxite and an alkaline solution is successively passed, wherein means is provided to assure that, when obstructions to flow occur, there is no substantial rise of pressure that might lead to destruction of the pumps or autoclaves.

Another object of the invention is the provision of apparatus for the continuous digestion of powdered bauxite by an alkaline solution, in which the process can be carried out at high temperature and pressure without appreciable danger.

Another object of the invention is the provision of apparatus for the continuous digestion of bauxites which are high in the monohydrate with high yield.

Another object of the invention is the provision of apparatus for the continuous digestion of bauxite including a series of autoclaves in which the temperature in the autoclaves is increased as the bauxite proceeds through them and, nevertheless, the process is carried on with good thermal efficiency.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawing in which:

The single FIGURE is a schematic view of apparatus embodying the principles of the invention.

According to the invention, the treatment of bauxite is carried out in a plurality of autoclaves, arranged in series and each provided with a stirring means. The first autoclave in the series is fed continuously with a suspension of the powdered solid in liquid, while a gaseous atmosphere, selected to be nonmiscible with the liquid under pressure, is maintained within the said first autoclave in the space above the mixture of solid and liquid. Preferably, the mixture is introduced below the level of the mixture already contained in the autoclave, so that the inlet or inlets are immersed. Furthermore, while each autoclave is fed at an upper level, the material is removed from the lower part and introduced at the upper part in the next autoclave of the series. It will be understood that the autoclaves may also be fed at their bottom portions, the material being removed from their upper portions. The upper part of the first autoclave, which contains the said gaseous atmosphere, is provided with means for introducing or removing gas so that the pressure may be maintained at a predetermined value; an alarm means warns of any variation in pressure. It can be seen, then, that, irrespective of the number of autoclaves in the series and irrespective of the length of the path through which the mixture must travel, the pump for introducing the mixture into the first autoclave is subjected only to the weight of the column of the mixture between the pump and the gaseous atmosphere and the gas pressure at the top of the first autoclave; at the same time, the greatest pressure that any autoclave in the series must withstand is the pressure of the gaseous atmosphere of the first one. Accordingly, if an obstruction or other similar accident occurs, there is no rise in pressure capable of destroying the pump or the autoclaves. At the same time, the difficulties are not experienced which occur when safety devices have to operate in a suspension of solids in a liquid which entirely fills the reaction vessel. In the preferred form of the invention the pump is of the diaphragm type and the upper part of the first autoclave is provided with a safety valve and a pressure-controlling device. The mixture is thoroughly stirred during its passage through the autoclave. The heat in the liquid at the end of the series of autoclaves is employed for heating the mixture within the other autoclaves of the series; in order to accomplish this purpose, the mixture leaving the autoclaves at the end of the series is conveyed through releasing chambers arranged in series. Steam is generated in the chambers and is used for heating the early autoclaves in the series. Thus, heat is retained that otherwise would be lost and the capacity of the evaporators usually used in this work is reduced; as a matter of fact, with the properly chosen conditions of temperature and concentration, there is no necessity for any further evaporation of the mixture.

Referring to the drawing, wherein is shown a preferred embodiment of the invention, the apparatus for continuous digestion, is shown as designed particularly for the continuous treatment of bauxite with sodium hydroxide brines. A bauxite conveyor 11 terminates over the inlet hopper 12 of a pulverizer 13, which is capable of grinding the bauxite to a fineness determined by the requirements of the pumping process and by the requirements of the chemical digestion, usually in the order of 500 microns. A sodium hydroxide brine storage tank 14 overlies the apparatus and is connected by a pipe 15 to a mixing tank 16; a branch pipe 17 leads to the hopper 12. The input side of a pump 18 is connected to the lower part of the mixing tank 16 and has its output side connected by a pipe 19 to the upper part of a heating tank 21. The tank 21 is provided with a steam heating coil 22 and a motorized agitator 23. A pipe 24 leads from the bottom of the tank 21 to the upper part of another heating tank 25 which is also provided with a steam heating coil 26 and an agitator 27.

A diaphragm-type pump 28 is provided with a pipe 29 having one branch 31 connected to the lower part of the heating tank 25 and another branch 32 leading to a first autoclave 33. A check valve 34 lies in the branch 31 and will allow flow only away from the tank 25; a similar check valve 35 is mounted in the line 32 and is arranged to permit flow only toward the autoclave 33. The pump 28 is of the well-known type in which a flexible membrane or diaphragm is moved to produce alternate variations in pressure in a chamber of which the diaphragm is a wall; this, combined with the restraining action of the check valves 34 and 35, brings about the pumping action.

The autoclave is of a closed construction having a steam heating coil 36 arranged around its inner surface and an agitating mechanism 37 mounted on its upper cover 38. The branch 32 enters the autoclave at a level A—A slightly below the level normally occupied by the mixture. The space 39 above the mixture is occupied by a gas having characteristics such that it is non-miscible with the mixture. The cover 38 of the autoclave is provided with a safety valve 41 and with a means for maintaining a preselected value of pressure of gas in the space 39, this means consists in part of a conduit 42 connected through a pressure regulating valve 43 to a source of gas under pressure, not shown.

The first autoclave is followed by seven other autoclaves 44, 45, 46, 47, 48, 49 and 51, provided, respectively, with steam heating coils 52, 53, 54, 55, 56, 57 and 58 and with motor-driven agitators, 59, 61, 62, 63, 64, 65 and 66. The lower part of the autoclave 33 is connected by a pipe 67 to the upper part of the autoclave 44; the lower part of the autoclave 44 is connected by a pipe 68 to the upper part of the autoclave 45, which in turn is connected at its lower part to one end of a pipe 69 the other end of which is attached to the upper part of the autoclave 46; the lower end of the autoclave 46 is connected by a pipe 71 to the upper end of the autoclave 47, the lower end of which is connected by a pipe 72 to the upper end of the autoclave 48; lastly, the lower end of the autoclave 48 is connected by a pipe 73 to the upper end of the autoclave 49, the lower end of which is connected by a pipe 74 to the upper end of the last autoclave 51.

The lower end of the autoclave 51 is connected by a pipe 75 through a diaphragm-controlled valve 76 to a blow-off tank 77; the tank 77 is the first of a series of tanks 77, 78, 79, 81, 82, 83 and 84 which are connected to permit the passage of the mixture therethrough, one after another. The lower part of the last tank 84 of the series is connected by a pipe 85 to a dilution tank 86 where a pipe 87 is also connected for the introduction of liquid to the mixture; a pump 88 is connected to the tank and has its output side connected in the usual manner to a means, not shown, for separating residues, as is conventional for this type of process.

The upper end of the blow-off tank 77 is connected by a line 89 to the inlet end of the heating coil 55 of the autoclave 47; similarly, the tank 78 is connected to the coil 54 of the autoclave 46, the tank 79 is connected to the coil 53 of the autoclave 45, the tank 81 is connected to the coil 52 of the autoclave 44, the tank 82 is connected to the coil 36 of the first autoclave 33, the tank 83 is connected to the coil 26 of the heating tank 25, and the tank 84 is connected to the coil 22 of the heating tank 21.

A series of condensate wells 91, 92, 93, 94, 95, 96, 97, 98, and 99 and 101 are associated with the apparatus; each condensate well has an inlet located centrally thereof into which steaming condensate may be introduced, a steam outlet at the upper end from which steam may be removed, and a liquid outlet at the lower end from which condensate may be drawn. The outlet end of the coil 22 of the heating tank 21 is connected to the inlet of the condensate well 91; in the same way, the coil 26 of the heating tank 25 is connected to the well 92, the coil 36 of the first autoclave 33 is connected to the well 93, the coil 52 of the autoclave 44 is connected to the well 94, the coil 53 of the autoclave 45 is connected to the well 95, the coil 54 of the autoclave 46 is connected to the well 96, the coil 55 of the autoclave 47 is connected to the well 97, the coil 56 of the autoclave 48 is connected to the well 98, the coil 57 of the autoclave 49 is connected to the well 99, and the outlet end of the coil 58 of the last autoclave 51 is connected to the inlet of the well 101. The liquid outlet of the well 101 is connected to the inlet of the well 99; similarly, the well 99 is connected to the well 98, well 98 to well 97, well 97 to well 96, well 96 to well 95, well 95 to well 94, well 94 to well 93, well 93 to well 92 and the liquid outlet of well 92 is connected to the inlet of well 91. The liquid outlet of well 91 is connected through a pump 102 to a sump tank, not shown. The steam outlets of the wells 98, 99 and 101 are connected together and to the inlet end of the coil 55 of the autoclave 47. The steam outlet of the well 97 is connected to the inlet end of the coil 54 of the autoclave 46; in the same manner, the well 96 is connected to the coil 53 of the autoclave 45, the well 95 is connected to the coil 52 of the autoclave 44, the well 94 is connected to the coil 36 of the autoclave 33, the well 93 is connected to the coil 26 of the heating tank 25, and the steam outlet of the well 92 is connected to the inlet end of the coil 22 of the heating tank 21. The inlet ends of the coils 56, 57, and 58 of the autoclaves 48, 49 and 51, respectively, are connected together and by means of a line 100 to a source of live steam, not shown.

A level indicator 103 is connected to a control means 104 which, in turn, is connected to the diaphragm-controlled valve 76 to maintain the level A—A of the mixture in the autoclave 33 at a preselected height. The control means 104 is also connected by a line 108 to the pump 28 to shut off the pump when the indicator 103 shows that the material in the autoclave 33 reaches the top. A temperature indicator 105 operates through a control means 106 to regulate a diaphragm in operated valve 107 in the live steam line 100 to assure that the temperature of the mixture leaving the autoclave 51 remains constant.

The operation of the apparatus and the manner of performing the process will now be readily understood in view of the above description. As has been indicated, the bauxite is ground with a small amount of the alkaline solution to a fineness consistent with pumping in the pulverizer 13. A slurry or mixture at about 65° C. is made of the powdered bauxite with the alkaline solution in the mixing tank 16 and is forced by the pump 18 through the pipe 19 into the heating tank 21 where it is heated by the steam in the coil 22 to a temperature of around 81° C. It is next heated in the heating tank 25 to around 97° C., the heating being accomplished by means of the coil 26. The diaphragm pump 28 forces the mixture into the upper part of the autoclave 33 below the level A—A of the mixture already there; the coil 36 in the first autoclave 33 raises the temperature of the mixture to around 113° C., the mixture being stirred constantly during the heating. The mixture flows continuously through the rest of the autoclaves and is heated by the coils therein. As indicated, the mixture enters each autoclave at the top and leaves at the bottom, thus ensuring thorough mixing.

The temperature rises progressively from 139° C. in the autoclave 44 to 230° C. in the last autoclave 51. The digestion process is completed at the outlet of the autoclave 51 and the mixture passes through the pipe 75 and the valve 76 to the blow-off tank; the steam released in the tank 77 is carried through the pipe 89 to the inlet end of the coil 55 of the autoclave 47 where it joins steam coming from the condensate wells 98, 99 and 101. The mixture flows successively through the blow-off tanks 77, 78, 79, 81, 82, 83 and 84 and is then carried through the pipe 85 to the dilution tank 86. The temperature of the mixture drops as it passes through the blow-off tanks; for instance, it enters tank 77 at 230° C., but leaves it at 214° C. Each of the blow-off tanks supplies steam to the coil of an autoclave. The heating coils are also provided with steam from a source of live steam, as in the case of coils 56, 57 and 58, or from the steam outlet of the condensate wells.

The process takes place in a continuous manner, the flow of the mixture and of steam being uninterrupted. The process, therefore, is well adapted to continuous control of flow and of temperature. The level indicator 103 acts through the control means to adjust the valve 76 and maintain the level of the mixture in the first autoclave 33 at a preselected height. The regulating valve 43 maintains the gas pressure in the space 39 at a preselected value. The safety device 41 permits the release of pressure in case of an accidental change of conditions in the autoclave. The temperature indicator 105 operates through the control means 106 and the valve 107 to maintain the temperature of the mixture leaving the autoclave 51 at a constant value. The control means 104 acts through the line 108 to shut off the pump 28 if the autoclave ever becomes full.

It should be noted that a variation of the level A—A in the first autoclave 33 controls not only the opening and closing of the valve 76 at the outlet of the last autoclave, but also, in case there is clogging in the circuit, the stopping of the pump 28. In effect, this pump allows a constant-volume flow of suspended material through the series of autoclaves to the valve 76. If partial clogging of one of the pipes in the circuit occurs, the rate of flow is lowered and the space 39 tends to fill. The indicator 103 and the control means 104 cause the valve 76 to open so that the rate of flow is restored. If complete clogging occurs, for instance, at the pipe 71, the valve 76 will not restore the normal rate of flow, even when fully open. The valve will simply lower the pressure in the autoclaves situated downstream of the pipe 71, i.e., autoclaves 47, 48, 49 and 51. However, at that time the pump 28 is still running and will eventually fill the space 39; this is an undesirable situation and it is, therefore, necessary to stop the pump 28 until the pipe 71 has been unclogged.

The aluminum oxide content of European bauxites is in the form of the monohydrate and ordinarily is difficult to attack with caustic soda. However, by use of the present invention it is possible to use high temperatures, resulting in 96 to 97% of the aluminum oxide being dissolved. Part of the aluminum oxide necessarily remains insoluble in the form of sodium silico-aluminate; since this part cannot be dissolved, it is well to use bauxites which are low in $SiO_2$. This improvement in the yield in the amount of aluminum oxide which is dissolved constitutes an important technical improvement made possible by the present invention.

The liquor entering the tank 86 must be diluted with water to permit the separation of the aluminum oxide by hydrolysis. After the precipitated aluminum oxide has been filtered out, the liquors must be recycled to be used further in the digestion of bauxite which is the object of the present invention. Before reusing the liquors, however, it is necessary to reconcentrate them by evaporating excess water, which requires heat. However, the use of a high temperature in the last autoclave 51 causes very important evaporation through pressure release in the tanks 77 to 84. The steam thus produced is more than adequate to heat the equipment, including the tanks 21 and 25 and the autoclaves 33, 44, 45, 46, 47, 48, 49 and 51; the excess steam is used to obtain the re-concentration of the liquors before returning them to the tanks 14 and 16. In this way, the use of high temperatures and high pressures (in the order of 25–30 kg./cm.$^2$) are economically possible because of the saving in the concentration of diluted liquors; this can be accomplished without sacrificing safety.

In an example of the operation of the apparatus, 40.8 tons of bauxite per hour were introduced into the tank 16 and this compound contained 54% of $Al_2O_3$ in the form of the monohydrate. The solution coming from the tank 14 was introduced into the tank 16 and there was a debit of 125 cubic meters per hour which had to be replaced by fresh chemical. The liquor contained 230 grams per liter of $Na_2O$ and about 125 grams per liter of $Al_2O_3$. The temperatures were as follows: in the tank 21, the temperature was 88° C., in the tank 25, the temperature was 94° C., in the first autoclave 33, the temperature was 115° C., at the second autoclave 44, the temperature was 140° C., at the third autoclave 45, the temperature was 159° C., at the fourth autoclave 46, the temperature was 174° C., at the fifth autoclave 47, the temperature was 188° C., at the sixth autoclave 48, the temperature was 216° C., at the seventh autoclave 49, the temperature was 227° C., and in the eighth and last autoclave 51, the temperature was 234° C. The pressure in the space 39 of the autoclave 33 was 32 kilograms per square centimeter and this pressure decreased along the autoclave circuit, because of the pressure drop, until the pressure in the autoclave 51 was 30 kilograms per square centimeter. The pump 28 discharged 141 cubic meters of suspended material per hour and 377 tons of $Al_2O_3$ were dissolved per day. It should be noted that the last three autoclaves 48, 49 and 51 were heated by steam from other sources at a pressure of 33 kilograms per square centimeter. This amounted to a loss of 15.86 metric tons of steam per hour or, in other words, the consumption of 1.11 tons of steam per ton of dissolved alumina. This meant that the efficiency was approximately 95%.

The slurry reached a temperature of 234° C. at the first blow-off tank 77 and it left the last blow-off tank 84 at 122° C. In the blow-off tanks the steam pressures were as follows: in the blow-off tank 77, the pressure was 16.6 kgs. per sq. cm., in the tank 78, the pressure was 11.7 kgs. per sq. cm., in the tank 79, the pressure was 7 kgs. per sq. cm., in the tank 81, the pressure was 4 kgs. per sq. cm., in the tank 82, the pressure was 2 kgs. per sq. cm., in the tank 83, the pressure was 1.1 kgs. per sq. cm., and in the tank 84, the pressure was 0.3 kg. per sq. cm. The temperatures of the waste water in the wells were as follows: at the entrance to the well 98, the temperature was 237° C., at the entrance to the well 97, the temperature was 204° C., at the entrance to the well 96, the temperature was 189° C., at the entrance to the well 95, the temperature was 171° C., at the entrance to the well 94, the temperature was 153° C., at the entrance to the well 93, the temperature was 134° C., at the entrance to the well 92, the temperature was 119° C., and at the entrance to the well 91, the temperature was 106° C. Through the pump 102 47.19 tons of water were discharged per hour. This water included 15.86 tons of waste water from the steam from the outside source and 31.33 tons per hour of water out of the cycle. These 31.33 tons represent what was gained due to the process, in comparison with the total water which would have to be evaporated during the cycle. It balances almost completely the water which must be added for washing the tailings of the process.

It should be noted that, whereas the trihydrate of alumina can be dissolved with temperatures from 100 to 105° C., the monohydrates cannot be dissolved by leaching with caustic soda even with temperatures as high as 170 to 173° C.; it is obligatory to finish the process at a temperature higher than 175° C. Since one of the advantages of the present process is in taking water from the cycle, it is important to take out as much as possible. Now, the quantity of water taken out depends on the difference between the temperature at the entrance to the first blow-off tank 77 (234° C. in the example) and the water coming out of the last blow-off tank 84 which is 122° C. This last temperature is determined by the further operations, i.e., the precipitation of alumina. For that reason one must have as high an entrance temperature in the blow-off tank 77 as possible, which means operating the autoclaves at a very high value. However, due to the present apparatus and combination, it is possible to do this without danger.

It can be seen, then, that the opportunity to form large quantities of water during the cycle causes an economy as to the total consumption of steam per ton of alumina which is made. In the example, 2.06 tons of steam were used per ton of alumina, but in an installation according to the prior art 4.5 tons of steam were necessary per ton of alumina. It is obvious that if the bauxite contained high percentages of trihydrate, that even lower amounts of steam would be consumed by operation with the present apparatus.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for the continuous digestion of powdered bauxite by an alkaline solution, comprising a series of autoclaves mounted on the same general level connected together for the continuous successive passage therethrough of a mixture of the bauxite and solution, a heating means in each autoclave, a pump preceding the first autoclave providing a portion of the motive power necessary to introduce the mixture into the series, means for maintaining in the said first autoclave in the series a gaseous atmosphere under substantial pressure to provide the remainder of the motive power necessary to introduce the mixture into the series, a valve for regulating the flow of mixture from the last autoclave of the series to assure that all autoclaves are completely filled with the mixture with the exception of the said first autoclave, and a liquid level sensing means mounted in the said first autoclave and operatively connected to the said valve to automatically maintain the level of the mixture in the first autoclave at a preselected height.

2. Apparatus as recited in claim 1, wherein the sensing means is connected to the pump to shut off the latter if the first autoclave approaches a filled condition.

3. Apparatus for the continuous digestion of powdered bauxite by an alkaline solution, comprising a series of autoclaves mounted on the same general level connected together for the continuous successive passage therethrough of a mixture of the bauxite and solution, a steam coil in each autoclave causing the mixture to be heated to successively higher temperatures as it progresses through the autoclaves, a pump preceding the first autoclave providing a portion of the motive power necessary to introduce the mixture into the series, means for maintaining in the said first autoclave in the series a gaseous atmosphere under substantial pressure to provide the remainder of the motive power necessary to introduce the mixture into the series, a valve for regulating the flow of mixture from the last autoclave of the series to assure that all autoclaves are completely filled with the mixture with the exception of the said first autoclave, and a liquid level sensing means mounted in the said first autoclave and operatively connected to the said valve to automatically maintain the level of the mixture in the first autoclave at a preselected height.

4. Apparatus for the continuous digestion of powdered bauxite by an alkaline solution, comprising a series of autoclaves mounted on the same general level connected together for the continuous successive passage therethrough of a mixture of the bauxite and solution, a steam coil in each autoclave causing the mixture to be heated to successively higher temperatures as it progresses through the autoclaves, a pump preceding the first autoclave providing a portion of the motive power necessary to introduce the mixture into the series, means for maintaining in the said first autoclave in the series a gaseous atmosphere under substantial pressure to provide the remainder of the motive power necessary to introduce the mixture into the series, a valve for regulating the flow of mixture from the last autoclave of the series to assure that all autoclaves are completely filled with the mixture with the exception of the said first autoclave, a liquid level sensing means mounted in the said first autoclave and operatively connected to the said valve to automatically maintain the level of the mixture in the first autoclave at a preselected height, and means whereby the sensing means is connected to the pump to shut off the latter if the first autoclave approaches a filled condition.

References Cited in the file of this patent

UNITED STATES PATENTS

| | | |
|---|---|---|
| 1,079,278 | Welbaschewtasch | Nov. 8, 1913 |
| 1,959,219 | Reed | May 15, 1934 |
| 2,107,919 | Turner et al. | Feb. 8, 1938 |
| 2,749,222 | Munroe | June 5, 1956 |